INVENTOR
Thomas G. Bixby
BY *Silverman & Cass*
ATTORNEYS

Jan. 20, 1970 T. G. BIXBY 3,490,779
VACUUM COUPLING FOR PERCUSSIVE HAMMERS
Filed Sept. 14, 1967 2 Sheets-Sheet 2
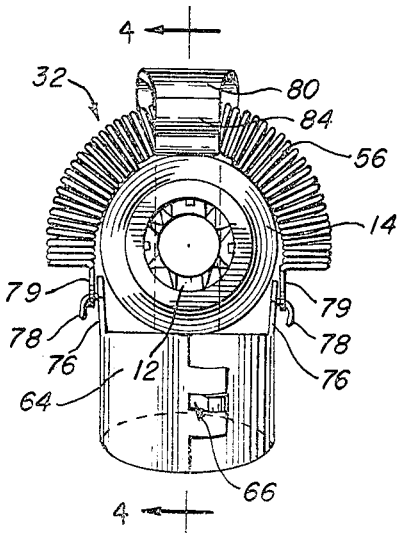
Fig. 3
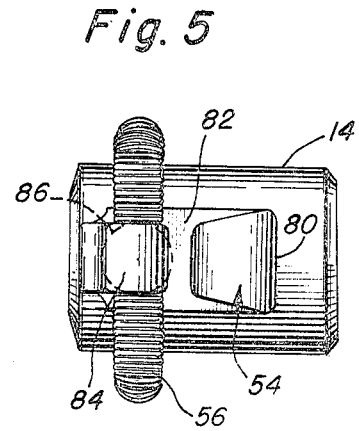
Fig. 5
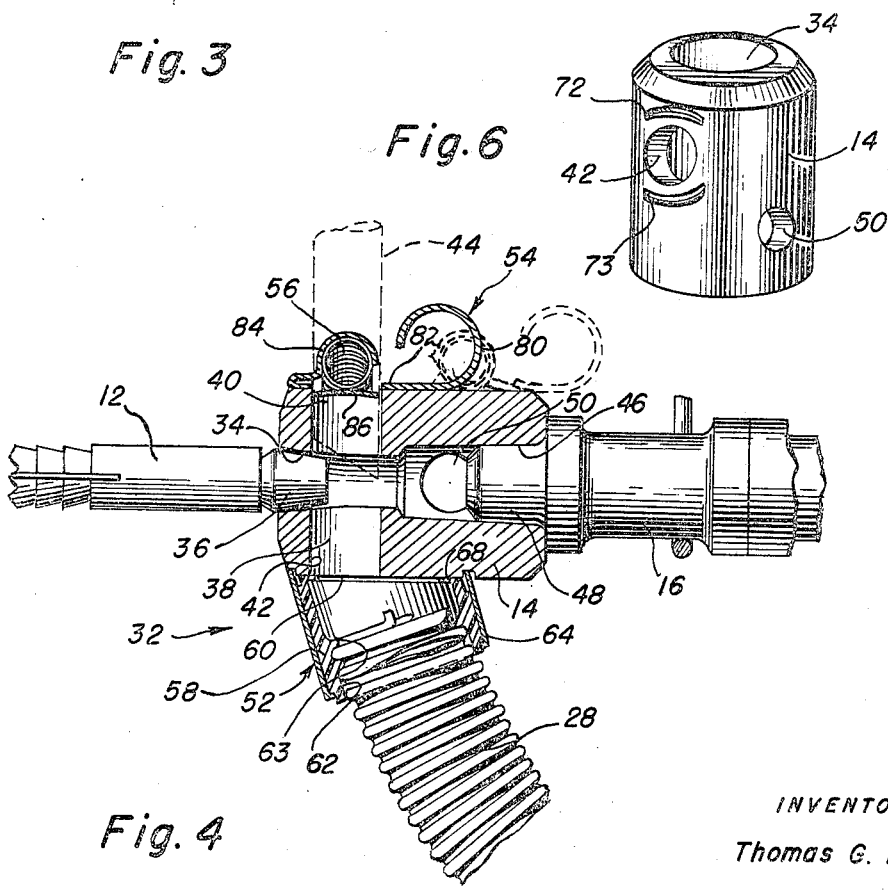
Fig. 6
Fig. 4
INVENTOR
Thomas G. Bixby
BY Silverman & Cass
ATTORNEYS ated Jan. 20, 1970

3,490,779
VACUUM COUPLING FOR PERCUSSIVE
HAMMERS
Thomas G. Bixby, Valparaiso, Ind., assignor, by mesne assignments, to Phillips Drill Company, Inc., Michigan City, Ind., a corporation of Indiana
Filed Sept. 14, 1967, Ser. No. 667,805
Int. Cl. B23b 31/10
U.S. Cl. 279—96                                    13 Claims

ABSTRACT OF THE DISCLOSURE

A coupling adapted to be secured to a chuck which in turn is mounted to a percussive hammer for enabling the debris and rubble to be drawn from a hollow tool carried by the chuck. An adapter in the form of cylindrical housing of sheet metal having an angled front edge and there being a soft insert in the housing which provides the gasketing and connecting structure. The configuration of the front end of the insert is that defined by the intersection of two cylinders whose axes form an acute angle relative to one another. A flexible hose is connected to the insert at one axial end thereof and the other end generally conforms to the cylinder surface of the chuck and has the same shape as the sheet metal housing so that an air tight connection is provided at the chuck. The chuck is of the type which has a transverse passageway intersecting the tool socket so that debris and rubble coming up the center of the hollow anchor mounted in the chuck will normally move out of the transverse passageway, but is prevented from doing so at one end by a metal clip and hence passes out of the other end, this being the end over which the adapter is engaged. The clip engages the chuck on the side opposite that to which the adapter is engaged and is connected thereto by a strong helical spring much like an encircling elastic band so that the clip and the adapter straddle the chuck on opposite faces thereof. A plug or offset part on the clip engages the opening of the transverse passageway to seat the clip and hold it in place during use. The clip has a finger loop so that it can be pulled axially rearward without disturbing the adapter, stretching the spring and uncovering the opening to the transverse passageway at that point, so that a drift pin or key may be inserted into the passageway to force a broken off end of a concrete anchor out of the chuck.

CROSS REFERENCE TO RELATED APPLICATION

Reference is made herein to a co-pending patent application entitled Percussive Hammer With Vacuum System for Cleaning Debris from Workpiece, Ser. No. 667,812 filed Sept. 14, 1967, and in which the applicant of this application is named as one of the co-applicants herein. The structure of the invention herein is especially intended for use with a percussive hammer of the type disclosed in said co-pending application, but is not limited thereto. The applications are both assigned to a common assignee. The disclosure herein is complete without need for referring to said co-pending application, but reference to said co-pending application may facilitate examination of this application.

BACKGROUND OF THE INVENTION

Field of the invention

The principal use for structures which are made in accordance with the invention is the installation of self-drilling anchors which are to be secured to masonry, concrete or the like.

In understanding the invention, it is believed advisable to describe the manner in which self-drilling anchors are installed. The conventional self-drilling anchor is a hardened hollow cylindrical steel member with a plurality of axial teeth at one end and a weakened tapered formation at the opposite end. Broaching teeth and axial cuts on the toothed end aid in the expansion. The tapered formation is inserted into a chuck which is mounted on a shank that is in turn inserted into the end of the percussive hammer. The chuck has a handle or bail connected therewith which is grasped by a workman. He presses the toothed end against the concrete surface, holding the hammer by its handle in his right hand, his finger on the trigger alongside of the handle. The bail is in his left hand. When he presses the trigger, the motor drives the hammer. Repeated blows are made against the shank end on the interior of the hammer by means of a reciprocating ram. The toothed end cuts into the concrete, and while this occurs the workman swings the bail back and forth in an arc which oscillates the anchor as it cuts.

During the cutting process, the concrete is chipped and broken away, producing dust or debris and rubble. The anchor being hollow, the debris and rubble will pass up the hollow and into the chuck. The chuck has a transverse passageway which communicates with the chucked end of the anchor so that the debris and rubble will pass out of the open ends of this transverse hole. This same transverse passageway has another function which arises after the anchor has been installed.

In this manner, the workman drills the hole in the concrete or masonry until the anchor has entered the surface to any desired depth, usually to the axial end face of the chuck. At this point, the workman withdraws the anchor still engaged in the chuck and blows the dust and debris out of the drilled hole with a suitable squeeze bulb. He inserts a short hardened steel plug in the toothed end of the anchor, re-inserts the anchor into the hole, pulls the trigger of the hammer, but doesn't rotate the chuck. The plug is driven into the toothed end of the anchor, splitting and expanding the anchor end on the interior of the hole, while undercutting the sides of the hole. When the anchor has been fully set, the workman gives the hammer a sharp lateral movement, breaking off the tapered end inside of the chuck and exposing the hollow interior of the anchor, which is threaded to receive a bolt therein.

In order to discharge the broken end, the workman inserts a drift pin or key into the passageway described above as providing the discharge for the debris and rubble and forces the said broken end out of the chuck. The hammer is then ready for the next anchor.

The principal problems which the invention is intended to solve are connected with the production of debris and rubble during the use of the hammer.

The debris and rubble which move up the bore of the anchor during conventional drilling must move by gravity in the case of overhead installations, or by the pressure of additionally produced debris and rubble in floor or wall installations. This movement is slow and labored in any case, and the bore of the anchor readily clogs which necessitates periodic removal of the anchor from the partially drilled hole in the attempt to dislodge the clogged material. Conventional drilling also proceeds in the presence of debris and rubble, the efflux of this material being accomplished by brute force since there are no flutes as in the case of many solid drills.

Additionally, dust is not fully removed. It binds the outside of the anchor within its hole; it pervades the atmosphere in the vicinity of the installation; it permeates the clothing of the workman; it filters into the hammer mechanism and produces inordinate wear; it is a consummate nuisance. All of this is added to the discharge of the debris and rubble from the chuck which is undesirable. Elimination of debris and rubble not only provides cleanliness and other advantages but also increases the speed of drilling.

In order to obviate the problems connected with the production of debris (which includes dust) and rubble during the installation of self-drilling concrete anchors, removal of this material during the drilling of the hole is indicated. The engagement of a shroud or housing around the chuck carrying the anchor would seem to be the answer, this shroud or housing being connected to a vacuum source, either externally of the hammer, or associated with the hammer as in the case of the said copending application. This answer is incomplete, however, because after having drilled its own hole, the anchor is set, the tapered end is broken off, and this later must be removed. This means that the connection to the source of vacuum must be provided along with some structure to enable the insertion of a drift pin into the passageway which carries the broken off end.

The principal object of the invention is to provide a structure which is quite simple and durable and which solves the problems better than do other known structures.

Another object of the invention is to provide a coupling for the purposes mentioned which may be secured to any size conventional chuck with a minimum of modification of the chuck being required to accommodate such coupling.

Other advantages and objects will become apparent from the details of the disclosure.

The prior art

The type of self-drilling anchors to be installed using the coupling of the invention is disclosed in U.S. Patent 1,996,121.

One type of electrically energized percussive hammer heretofore used for installing such anchors is disclosed in U.S. Patent 1,968,055.

The chucks which are utilized in conjunction with the coupling are to a considerable extent disclosed in U.S. Patents 2,918,290 and 2,936,736.

The problem of being able to draw off the debris and rubble while at the same time being able to remove the broken-off end of the self-drilling anchor after setting has been attacked by the patentees of U.S. Patent 3,131,947 by making a special chuck have a permanent laterally angled tube or nipple for securement to a vacuum hose. In such patent the function of the transverse passageway of the chucks of U.S. Patent 2,918,290 was limited to removal of the broken-off end of the anchor, and hence there was only one lateral branch for said passageway, and its opening was covered by a split ring seated in an annular groove, adapted to be rotated to align the split with the entrance to permit insertion of the drift pin or ejection tool. Aside from the nuisance of manipulating the split ring, such structure was expensive to manufacture and there had to be a separate such expensive chuck for each size of anchor.

In trying to avoid the nuisance of manipulating the split ring of the structure of Patent 3,131,947, it was proposed to utilize a self-ejecting chuck handle, or combined handle and key as referred to in U.S. Patent Re. 24,639. This was also a relatively expensive expedient and required special structures and abrasive-resisting materials, in addition to the already expensive chuck.

As stated, the invention herein uses a conventional chuck with a simple modification to enable the fitting of the coupling, and the coupling itself is simple, so that it is economical and effective to use the invention. Importantly, the minor change made to the chuck does not affect its availablity for use in conventional systems not utilizing vacuum withdrawal of debris and rubble. Accordingly, the manufacturer can make all of his chucks identically on the same production line and the users may or may not use a vacuum system according to their own desires or requirements.

As for vacuum systems, the invention herein is usable with systems in which there is an extenral source of vacuum having a conduit to be coupled to the chuck or workpiece. It is known to couple a tool or workpiece with an external source of vacuum by the use of a housing or shroud around the workpiece. Only one known structure attempts to solve the problem of additionally providing means for enabling a key or drift pin to be inserted into the transverse passageway of a substantially conventional chuck coupled to a source of vacuum, this being the device disclosed in U.S. Patent 3,220,742. In this latter patent, a rubber T-shaped hollow member of relatively thin wall construction is used to engage over a conventional chuck, and the central pipe of the member is connected to a source of vacuum. The problems encountered with this structure are that there is an inordinate amount of wear and abrasion to which the structure is subjected and there is difficulty in these structures standing up to such wear. Further, the need for flexibility and resilience to enable a single size of member to accommodate several sizes of chucks must be offset against the wear factor. The thicker members will last longer but are harder to stretch for fitting other sizes of chucks. Additionally, the rubber crosshead of the T must be pushed aside to give access for the drift pin in the transverse debris passageway and thin walls wear out rapidly, while thick walls are difficult to manipulate.

SUMMARY OF THE INVENTION

The invention comprises a structure which couples the chuck of a percussive hammer to an external source of vacuum by means of a conduit leading from the chuck to said source. There is a conventional chuck having an axial connection with the hammer at one end thereof and a socket in the other axial end thereof for reception of a self-drilling anchor of the break-off type, the socket intersecting a transverse passageway in the chuck so that when an anchor is installed its tapered end is in the passageway. The chuck has a resilient fitting against the outside surface over one end of the transverse passageway and a cover member in the form of a sheet metal clip held against the outside surface over the other end of the transverse passageway. The connection is effected by a coiled spring or other elastic member, the clip being movable along the chuck surface in an axial direction so that the second end of the transverse passageway may be uncovered to permit insertion of a key or drift pin. The resilient fitting is disposed in a cup or cylindrical housing having ears to which the elastic member is secured, the resilient fitting comprising an insert for the housing. A flexible pipe is connected to the resilient fitting to lead the debris and rubble away from the chuck by way of the transverse passageway and the first end thereof, so that the insert and housing together comprise an adapter to couple the flexible pipe to the transverse passageway.

The invention includes the coupling structure adapted to be secured to a chuck, and the combination of chuck and the coupling structure.

BRIEF DESCRIPTION OF THE DRAWINGS

FIG. 3 is a front-on elevational view of the coupling device taken generally from the right hand end of FIG. 2 and looking to the left.

FIG. 4 is a fragmentary sectional view taken generally along the line 4—4 of FIG. 3 and in the direction indicated.

FIG. 5 is a top plan view of the coupling device associated with a chuck according to the invention.

FIG. 6 is a perspective view showing a conventional chuck modified to enable the coupling device to be secured thereto.

DESCRIPTION OF THE PREFERRED EMBODIMENT

The invention is embodied in a structure which is secured to a chuck by an elastic band. One side has the adapter to enable a flexible hose to be coupled to one end of the transverse passageway of the chuck, and the other side has a clip or cover member which blocks off the other end of the transverse passageway of the chuck. The adapter has an interior insert of resilient material which is engaged in substantially air-tight engagement with the surface of the chuck. The clip or cover member can be pulled out of its normal position to enable a drift pin or ejection key to be inserted into the passageway.

Figure 1:
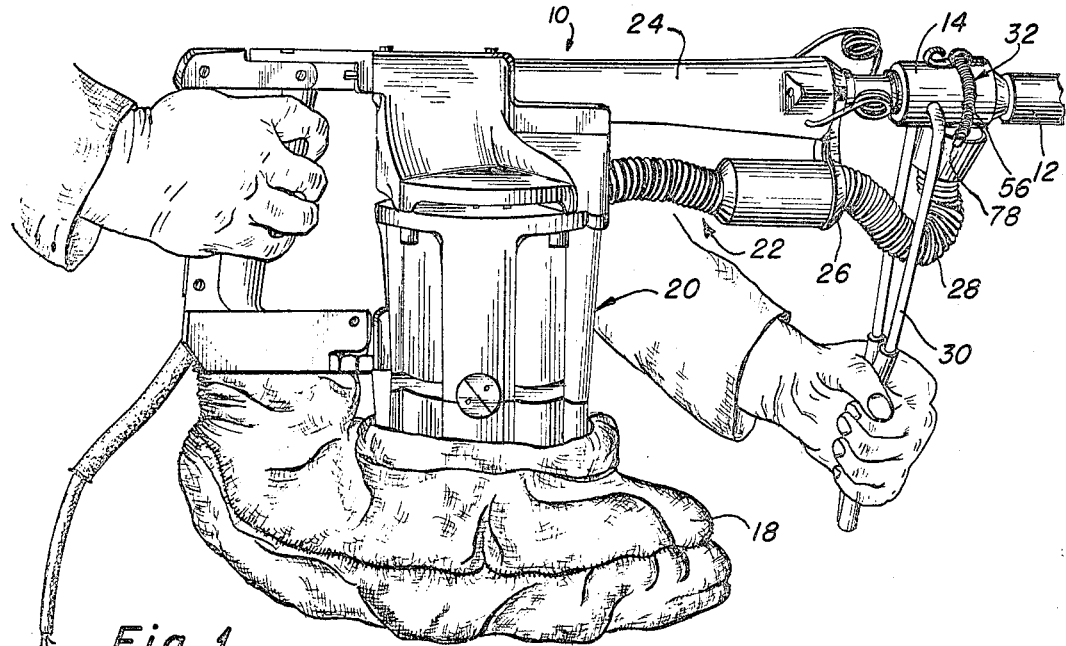
FIG. 1 is a view generally in side elevation illustrating a structure constructed in accordance with the invention associated with a percussive hammer of the structure of the co-pending application, said hammer being shown in use by a workman.

As previously stated, the invention may be associated with an external source of vacuum that is not connected to the percussive hammer or may be associated with a vacuum system that is built into the hammer itself, as disclosed in said co-pending application. In FIG. 1 the hammer 10 is held by a workman for installation of the self-drilling anchor 12 that is mounted in the chuck 14 carried on the shank 16 that is to be reciprocated by the hammer. The shank 16 has been called an adapter in the trade and it may be separate from the chuck 14 but connected thereto by a taper and socket connection, or as an alternative, the chuck 14 and shank 16 may be integral. It is immaterial to the invention which anchor-holding structure is used.

In the structure shown, the hammer 10 has a vacuum system built into the same, and the external manifestations thereof are represented by a debris accumulating bag 18 on the bottom of the motor housing 20, a debris conducting conduit 22 spaced below the barrel 24 and connected between the motor housing 20 and the depending bracket 26, and by the fact that the flexible hose 28 which is a part of the coupling device of the invention connects to the conduit 22 at the bracket 26.

The chuck 14 is of a conventional construction except in one small respect which will be mentioned below, and has at its rear sockets to enable the securement of the handle or bail 30 that is grasped by the workman and oscillated while the hammer 10 is being operated to cause the anchor 12 to drill its own hole in the concrete or masonry.

The coupling device is designated 32 and it is associated with the chuck 14 in the manner generally described above and particularly set forth hereinafter.

The chuck 14 has an axial socket 34 at its forward end into which the tapered break-off end 36 of the anchor 12 is adapted to engage. It has a transverse passageway 38 into which the end 36 partially protrudes, and the passageway 38 has two openings 40 and 42 which conventionally discharge the debris and rubble and also admit a drift pin or ejector key such as shown in broken lines at 44 to enable the broken-off end 36 to be ejected. At its rear end, the chuck 14 has a tapered socket 46 into which the tapered nose 48 of the shank 16 is engaged. Sockets at 50 enable the ears of the bail or handle 30 to be mounted to the chuck 14. These sockets may be the end of a second transverse passageway whose purpose is to enable the nose 48 to be drifted out of engagement with the chuck, if desired.

The coupling device 32 comprises the adapter 52, the cover member 54, the elastic band means 56 and the flexible pipe 28. The adapter 52 serves the function of adapting the pipe 28 to the chuck 14. There is a resilient insert 58 preferably formed of a synthetic resin such as a vinyl plastic, molded with a circular cross-section, whose axis is arranged at an angle relative to the axis of the chuck 14. The insert 58 is hollow and thereby provides an opening 60 at one end thereof and a socket 62 at the outer end thereof, the socket 62 seating the end of the flexible hose 28. Conveniently such end may be cemented in place. The hose 28 is preferably of a type reinforced with a helical wire imbedded or retained therein and is of a commercially avaliable construction. The interior of the insert 58 may be threaded as at 63 to receive a threaded pipe end.

The opening 60 has an end configuration 68 which is cylindrical in conformity with the surface of the chuck 14 surrounding the entrance 42 of the transverse passageway 38. This would represent the intersection of two cylinders, the purpose being so that there is a tight engagement of the insert 58 with the chuck 14.

The insert 58 is carried within a sheet metal housing 64 that provides the stiffness and durability required for the adapter. The sheet metal housing 64 will preferably have a slot and tongue joint as shown at 66 so that it may be stamped in the flat, curved to shape and connected end to end. Its inner edge conveniently is formed on a plane that is at an angle to the axis of the housing 64 so that the engaging end 68 which surrounds the opening 60 may be pressed against the chuck surface without interference. Such edge of the housing 64 is designated 70 and the chuck 14 is provided with milled slots at 72 and 73 as shown in FIG. 6 to seat the edge 70 of the housing 64 where it engages the chuck 14. This is the only departure of the chuck 14 from conventional construction.

Integral with the housing 64 is a pair of ears on diametrically opposite sides thereof at 76, such ears having tongues 78 within which are hooked the end loops 79 of the coiled spring 56.

Figure 2:
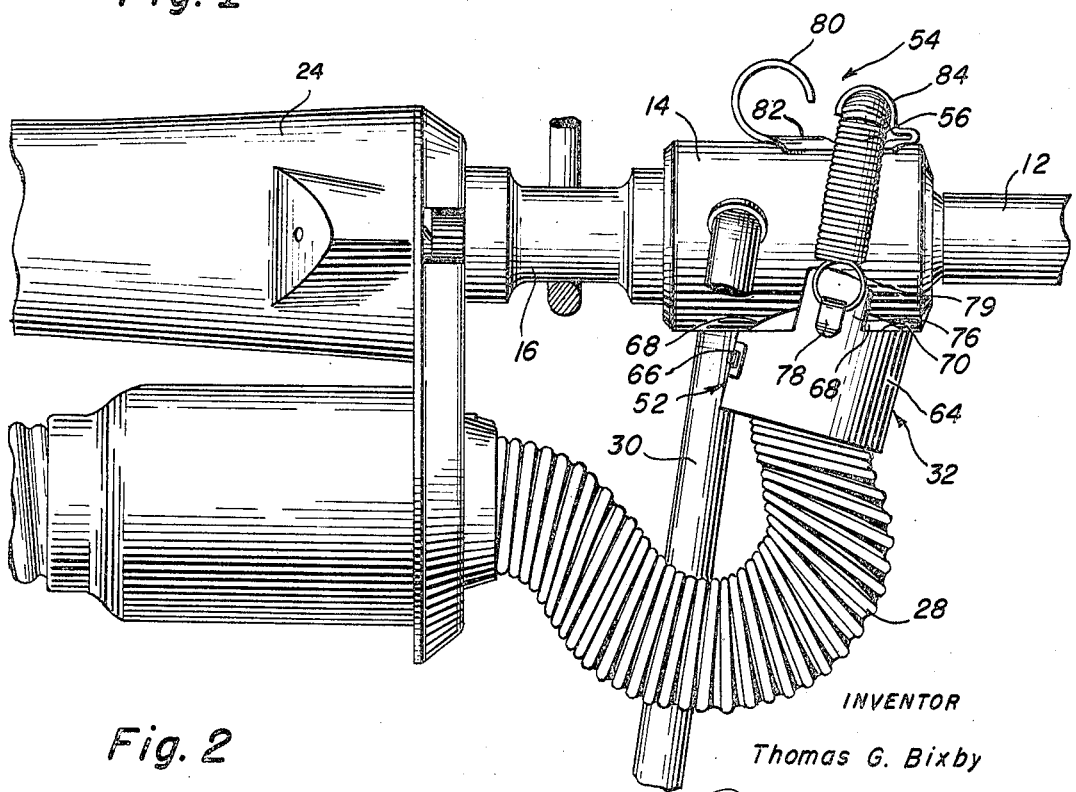
FIG. 2 is a fragmentary side elevational view of the structure of the invention installed on the end of the percussive hammer of FIG. 1 but on an enlarged scale.

The coiled spring 56 is in effect an elastic band which engages around the surface of the chuck 14 opposite the opening 42 tightly to hold the adapter 52 in place. Relative movement between the adapter 52 and the opening 42 is prevented by reason of engagement of the end edges 70 of the housing 64 with the grooves 72 and 73. It will be appreciated that the angle between the axis of the cylinder housing 64 and the chuck 14 considered from the hammer side of FIGS. 2 and 4, is acute. This keeps the flexible pipe 28 short in the case of a hammer having a built-in vacuum system, and in any event, even in the case where the pipe 28 extends to an independent vacuum system, the acute angle of the housing 64 decreases the likelihood of the pipe 28 dragging on the surface of the concrete object in which the anchor 12 is being installed. Recall that while the hammer is being used, the workman swings the chuck in an oscillating back-and-forth movement as the anchor is drilling its own hole. This also swings the portion of the pipe 28 immediately adjacent the housing 64 and since, for proper installation, the anchor is permitted to drill its way down to the point where the axial end of the chuck is practically engaging the concrete surface, if the axis of the housing 64 were normal to the axis of the chuck, there would be an increased likelihood of the pipe 28 dragging on such surface.

Obviously the scope of the invention is intended to cover coupling devices in which the angle between axes of the housing 64 and chuck 14 respectively is other than acute. Nevertheless the acute angle connection is preferred.

Considering for the moment the modification needed for the chuck 14, the grooves 72 and 73 seat the adapter 52 and prevent the adapter from rotating relative to the chuck while the hammer is being used. They also prevent axial movement of the adapter 52 rearward of the chuck when the opening 40 is uncovered, as will be described, but the scope of the invention likewise is intended to include any structure in which other means for preventing relative movement between the housing 64 and the chuck 14 are used.

The cover member 54 serves several purposes and functions. Preferably it is formed as a sheet metal clip including a finger loop 80 which may be grasped by the workman to enable the cover member 54 to be pulled to the left, as viewed in FIG. 2, a flat arcuate portion 82 engaging the surface of the chuck 14 opposite the adapter 52 and a reverse-bent clip 84 that clips or clamps the spring 56 to the flat arcuate portion 82. A portion of the flat arcuate portion 82 may be deformed or partially punched out of the said portion, as shown at 86, to form a plug or protrusion engaging the opening 40 of the transverse passageway 38. This positions the cover member 54. When disposed as described, the spring 56 serves as an elastic band connecting the adapter 52 and the cover member 54 and straddling the sides of the chuck 14.

After the anchor 12 has drilled its hole, has been set, and the end 36 has been broken away from the body of the anchor, the workman grasps the cover member 54 by the loop 80, tilts it upwardly a sufficient amount to enable the plug 86 to clear the opening 40 and then draws the entire cover member axially rearwardly of the chuck as indicated in FIG. 4, by the phantom lines, exposing the opening 40 of the transverse passageway 38. A drift pin or ejection key 44 is then inserted into the entrance 40 and forces the broken-off end 36 out of the socket 34.

As previously mentioned, the functions to be performed by the coupling device 32 include providing a support for the pipe 28 while coupling the same to the passageway, enabling accesss to the transverse passageway 38 to permit ejection of the broken-off end 36 and providing these functions in a manner which will withstand hard use. Variations are readily made in the details without departing from the scope of the invention. For example, the grooves 72 and 73 could be eliminated and in place thereof some means provided to position the adapter 52 by extensions or fingers protruding into the sockets 50 or passageway used to mount the handle 30. Likewise, the spring 56 may be replaced by a heavy band of rubber or other elastic material capable of holding up under the conditions in which the apparatus is used.

What it is desired to secure by Letters Patent of the United States is:

1. In combination, a chuck adapted to mount a hollow expansion anchor of the type which includes a frangible portion for setting in a masonry or the like surface, said chuck including a body portion having an axial socket therein for receiving said frangible portion of said anchor and a transverse passageway communicating with said socket and opening at opposite ends thereof to the outer peripheral surface of said body portion; a vacuum coupling detachably mounted to said chuck, said coupling comprising an adapter sealingly engaged with one of the open ends of said transverse passageway and constructed such that it may be coupled to a vacuum source for removing cutting debris or the like through said one open end, a cover member engaged against a surface of said body portion in blocking relationship with the other of said open ends of the transverse passageway, and eleastic means interconnecting the adapter and cover member and thereby holding said vacuum coupling in assembled relationship about the outer surface of said body portion, said elastic means constructed and arranged to enable movement selectively of the cover member axially relative to said chuck and adapter to uncover said other open end of the transverse passageway such that a drift pin may be engaged therein to remove the frangible portion of the anchor after said anchor has been set and to return the cover member once said removal is effected and the drift pin disengaged.

2. A combination as defined in claim 1 wherein said adapter and said chuck are provided with interengageable means substantially preventing inadvertent movement therebetween.

3. A combination as defined in claim 2 wherein said interengageable means include groove means formed in the outer peripheral surface of the chuck body portion, said groove means seating therein a portion of said adapter.

4. A combination as defined in claim 1 wherein said adapter includes an outer housing and a hollow resilient insert disposed in said housing such that in the assembled relationship one end of said insert is held in tight sealing engagement about the said one open end of the transverse passageway.

5. A combination as defined in claim 4 wherein said housing and said chuck are provided with interengageable means substantially preventing inadvertent axial movement of said housing relative to said chuck.

6. A combination as defined in claim 4 wherein said housing, said insert and said chuck are all of cylindrical configuration, said chuck being provided with a pair of arcuate grooves in which the edge of the end portion of said housing is received to prevent relative movement therebetween.

7. A combination as defined in claim 4 wherein said housing is composed of a substantially flat one piece elongated metal stamping that is formed and connected end to end to provide a hollow configuration, said connected ends being provided with interengageable means to maintain said housing in the formed configuration.

8. A combination as defined in claim 4 wherein said chuck has a cylindrical configuration, and said housing and insert are coaxial cylindrical members, the edge of said housing adjacent the chuck being formed on a plane that is at an acute angle to the axis thereof so that the end portion of said insert may be thrust against the upper surface of the chuck spaced forward of said housing edge to be free to elastically change shape without interference from said housing, such that said resilient insert will conform to the outer configuration of said chuck to provide an efficient seal about said one open end of the transverse passageway.

9. A combination as defined in claim 1 wherein said cover member includes a first portion conforming to and engaged against the outer surface of the chuck, and a second portion providing the means whereby a workman may grasp a cover member and move same axially relative to the chuck to uncover said other open end of the transverse passageway when it is desired to engage the drift pin therein.

10. A combination as defined in claim 9 wherein said first portion of the cover member is provided with an inwardly directed protrusion engaged in said transverse passageway to prevent inadvertent movement of the cover member from the blocking position.

11. A combination as defined in claim 1 wherein said elastic means includes a resilient elongated coil spring having the ends thereof attached to diametrically opposed portions of the adapter, the said cover member being secured to said coil spring intermediate the ends thereof.

12. In combination a chuck adapted to mount a hollow expansion anchor for setting in a masonry or like surface, said chuck including a body portion having an axial socket for receiving said anchor and a transverse passageway communicating with said socket and opening at its opposite ends to the surface of said body portion; a vacuum coupling detachably mounted to said chuck, said coupling comprising an adapter engaged about one of the open ends of said transverse passageway and adapted to be coupled to a vacuum source for removing cutting debris and the like through said open end, said adapter including an outer housing and a hollow resilient insert one end of which is held in tight sealing engagement about the said one open end, a cover member engaged against said body portion and blocking relationship with the other of said open ends of the transverse passageway, elastic means interconnecting the adapter and cover member to hold same in engagement about the outer surface of said chuck, and interengaged means on said housing and said chuck such that said cover member may be moved axially relative to said chuck to expose said other open end of the transverse passageway permitting a drift pin to be engaged therein without moving the adapter relative to said chuck.

13. A vacuum coupling adapted to be detachably mounted about the outer surface of a chuck used with a hollow self-drilling expansion anchor, said chuck having an axial socket therein for receiving said anchor and a transverse passageway communicating with said socket and opening at the opposite ends thereof through the outer surface of said chuck, said vacuum coupling including a hollow adapter member having one end provided with resilient means adapted to be engaged against chuck surface to provide a seal and the other end adapted to be coupled to a vacuum source, a cover member having a configuration providing contiguous contact with the outer surface of a chuck, and elastic means interconnecting the adapter and cover member, such that said coupling may be positioned about the outer surface of a chuck with the adapter sealingly engaged about one of the open ends of said transverse passageway and the cover member in blocking relationship with the other of said open ends of the transverse passageway, said elastic means constructed and arranged to enable movement selectively of the cover member axially of the chuck and adapter to expose said other open end so that a drift pin may be engaged therein when so desired and to return the cover member once said removal is effected and the drift pin disengaged.

References Cited

UNITED STATES PATENTS 3,131,947   5/1964   McCarty et al. _____ 279—103
3,220,742   11/1965   Moates.

ROBERT C. RIORDON, Primary Examiner

DONALD D. EVENSON, Assistant Examiner